(12) United States Patent
Boras et al.

(10) Patent No.: US 8,938,267 B2
(45) Date of Patent: Jan. 20, 2015

(54) METHOD AND APPARATUS FOR CREATING AND SENDING A CODE GRID TO A PORTABLE COMMUNICATION DEVICE

(75) Inventors: Drago Boras, Akarp (SE); Denis Peteh, Olofstrom (SE)

(73) Assignee: Mobill Scandinavia AB, Malmö (SE)

( * ) Notice: Subject to any disclaimer, the term of this patent is extended or adjusted under 35 U.S.C. 154(b) by 970 days.

(21) Appl. No.: 12/519,201

(22) PCT Filed: Dec. 14, 2007

(86) PCT No.: PCT/EP2007/064008
§ 371 (c)(1),
(2), (4) Date: Nov. 12, 2009

(87) PCT Pub. No.: WO2008/071802
PCT Pub. Date: Jun. 19, 2008

(65) Prior Publication Data
US 2010/0048230 A1   Feb. 25, 2010

(30) Foreign Application Priority Data
Dec. 15, 2006  (SE) ...................................... 0602721

(51) Int. Cl.
| | | |
|---|---|---|
| *H04W 4/00* | (2009.01) | |
| *G06Q 20/32* | (2012.01) | |
| *G06Q 20/04* | (2012.01) | |
| *G06Q 30/04* | (2012.01) | |
| *G06Q 30/06* | (2012.01) | |

(52) U.S. Cl.
CPC .......... *G06Q 20/3255* (2013.01); *G06Q 20/045* (2013.01); *G06Q 20/32* (2013.01); *G06Q 30/04* (2013.01); *G06Q 30/0601* (2013.01)
USPC .......................................... 455/466; 455/406

(58) Field of Classification Search
CPC ... G06Q 20/32; G06Q 30/04; G06Q 30/0601; G06Q 10/02; G06Q 20/3274; G06Q 20/045; G06Q 20/3255; G06K 19/06037; G06K 7/1443; H04W 4/14; H04W 4/12; H04W 4/24; H04W 2215/28
USPC ................. 235/435, 436, 447, 456, 460, 461, 235/462.01, 462.02, 462.03, 462.04, 235/462.05, 462.07, 462.08, 462.1, 462.11, 235/462.14, 494; 455/405, 406, 466
See application file for complete search history.

(56) References Cited

U.S. PATENT DOCUMENTS

| | | | | |
|---|---|---|---|---|
| 4,535,204 | A * | 8/1985 | Hughes et al. | ........... 379/357.04 |
| 2002/0060246 | A1 | 5/2002 | Gobburu et al. | |

(Continued)

FOREIGN PATENT DOCUMENTS

| | | |
|---|---|---|
| EP | 0 564 708 A | 10/1993 |
| EP | 1 480 476 A | 11/2004 |

(Continued)

OTHER PUBLICATIONS

International Search Report, corresponding to PCT/EP2007/064008 mailed Jun. 5, 2008.

(Continued)

*Primary Examiner* — Dinh P Nguyen
(74) *Attorney, Agent, or Firm* — Renner, Otto, Boisselle & Sklar, LLP

(57) ABSTRACT

A method and apparatus for sending a code grid representing an indication of payment for a good or service from a service provider (107), to a customer's portable communication device (101) using SMS messaging is disclosed. In response to receiving a request from a customer to purchase good or service, the code grid is created. The code grid is then sent to the customer's portable communication device in a SMS message.

15 Claims, 4 Drawing Sheets

(56) References Cited

U.S. PATENT DOCUMENTS

| | | |
|---|---|---|
| 2005/0051622 A1 | 3/2005 | Mak |
| 2006/0081704 A1* | 4/2006 | Boyd .......................... 235/382 |
| 2007/0023523 A1* | 2/2007 | Onishi ........................ 235/454 |
| 2008/0191909 A1* | 8/2008 | Mak ............................. 341/95 |

FOREIGN PATENT DOCUMENTS

| | | |
|---|---|---|
| GB | 2 361 570 A | 10/2001 |
| WO | 03/023674 A1 | 3/2003 |
| WO | 2004/092993 A1 | 10/2004 |
| WO | 2005/081512 A1 | 9/2005 |
| WO | 2005/83640 A1 | 9/2005 |
| WO | 2006/114613 A1 | 11/2006 |

OTHER PUBLICATIONS

Written Opinion, corresponding to PCT/EP2007/064008 mailed Jun. 5, 2008.

* cited by examiner

METHOD AND APPARATUS FOR CREATING AND SENDING A CODE GRID TO A PORTABLE COMMUNICATION DEVICE

FIELD OF THE INVENTION

The present invention relates to an electronic ticket and more particularly to a method and apparatus for sending a code grid representing an indication of payment for a good or service to a customer's portable communication device using SMS messaging.

BACKGROUND OF THE INVENTION

The use of portable communication devices such as mobile telephones, PDA's, etc. has exploded in the last decade. Many people use their portable communication devices regularly throughout the day and carry them wherever they go. The portable communication devices are usually equipped with screens which can display a variety of information and can be used to conduct business transactions. For example, a customer may call a service provider, for example, a bus company, and buy a ticket for bus travel. The problem becomes how can the service provider send a receipt for the purchase to the customer which the customer can then use to obtain the purchased good or service.

A known method for providing a receipt is to create a barcode or data matrix which can be ready by a scanner. The scanner interprets the series of bars or data matrix to determine the coded message which represents a receipt for the purchased good or service.

One method for providing a receipt for a customer would be to create a barcode or data matrix representing the receipt and send the barcode or data matrix to the customer. In order to send a barcode or data matrix, the service provider would have to send the barcode or data matrix using multimedia messaging service (MMS). The graphical display of the barcode or data matrix can then be displayed on the screen of the portable communication device.

There are, however, several problems and drawbacks to using such a system. First of all, not all portable communication devices are configured to have MMS capabilities. Furthermore, not all communication systems can handle MMS. In addition multimedia content created for one brand of MMS device may not be entirely compatible with the capabilities of the other MMS devices. Furthermore, the recipient's MMS device is responsible for providing for content application, e.g. image resizing, audio codes transcoding, etc. which might render the barcode or data matrix unreadable. Finally, MMS is relatively expensive to use and places payload and power burdens on the communication system.

Thus, there is a need for a new method and apparatus for sending a graphical representation of a receipt for goods and services which overcomes the problems cited above.

SUMMARY OF THE INVENTION

It is therefore a feature and advantage of the present invention to provide a method and apparatus for sending a code grid representing an indication of payment for a good or service to a customer's portable communication device using SMS messaging.

In accordance with one embodiment of the present invention, a method for sending a code grid representing an indication of payment for a good or service from a service provider, to a customer's portable communication device using SMS messaging is disclosed. In response to receiving a request from a customer to purchase good or service, the code grid is created. The code grid is then sent to the customer's portable communication device in a SMS message.

In accordance with another embodiment of the invention, an apparatus for sending a code grid representing an indication of payment for a good or service from a service provider, to a customer's portable communication device using SMS messaging is disclosed. The apparatus comprises a receiver for receiving a request from a customer to purchase a good or service, a processor for creating the code grid, and a transmitter for sending the code grid to the customer's portable communication device in a SMS message.

According to another embodiment of the invention, a computer-readable medium having embodied thereon a computer program for processing by a computer, the computer program comprising: a first code segment for receiving a request from a customer to purchase good or service; a second code segment for creating the code grid; and a third code segment for sending the code grid to the customer's portable communication device in a SMS message.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will now be described, by way of example, with reference to the accompanying drawings, wherein.

DETAILED DESCRIPTION

The invention related to a method and apparatus for providing an efficient and widely available manner of sending a graphical representation of a receipt for a good or service to a portable communication device for display on a screen of the portable communication device. The invention creates a code grid which represents the receipt and which can be transmitted to the portable communication device using short messaging service (SMS). One advantage of the invention is that most portable communication devices and communication systems support SMS. In addition, SMS is cheaper to use than MMS and provides less of a load on the communication system. Furthermore, the portable communication device does not need to resize the message for display.

Figure 1:
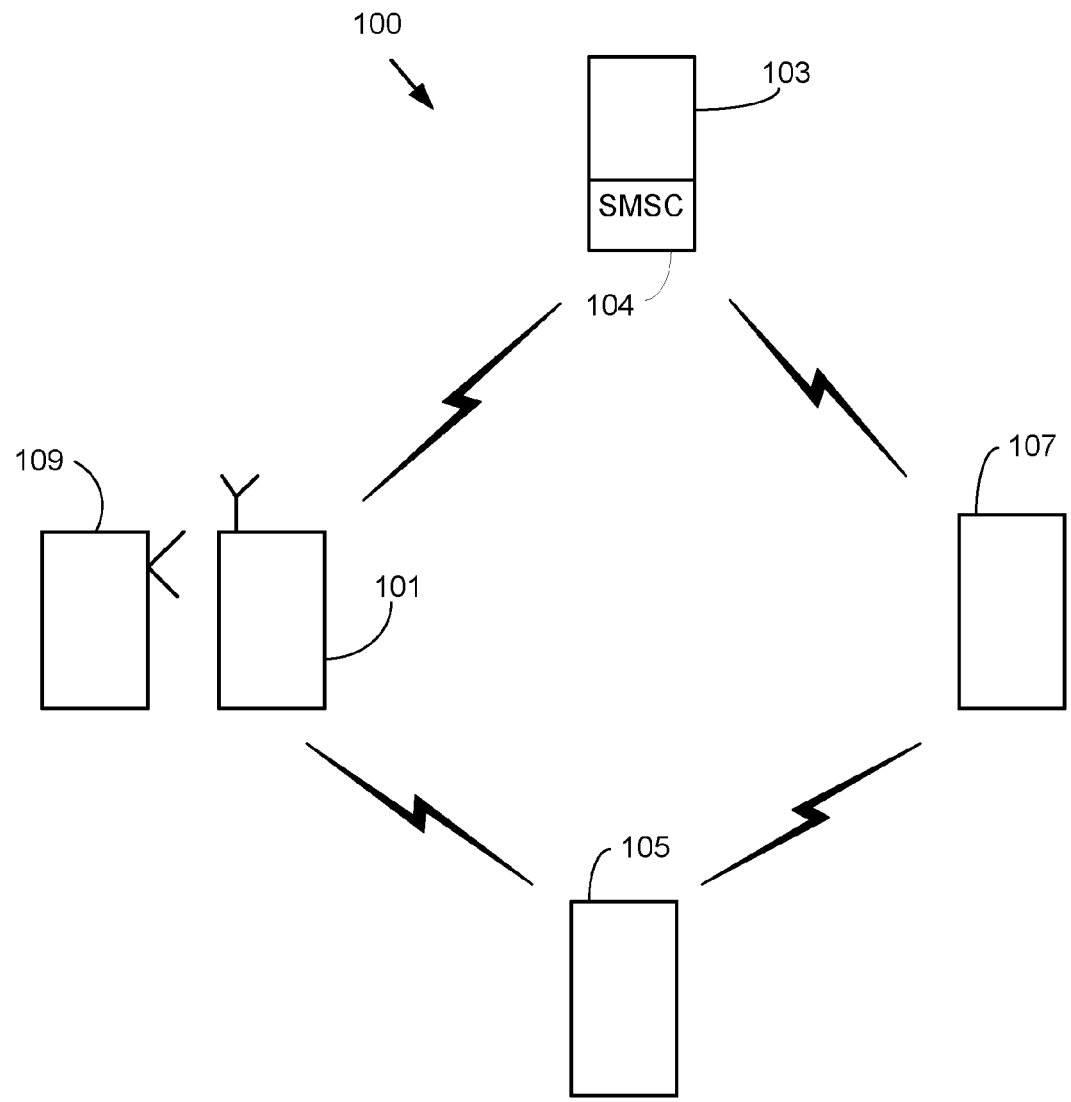
FIG. 1 discloses a communication system according to one embodiment of the invention.

FIG. 1 discloses a system 100 in which the present invention can be employed. The system 100 comprises, among other features, a portable communication device 101 (e.g., a mobile telephone, a PDA, etc.), a communication system 103 with a Short Message Service Center (SMSC) 104 which supports SMS, a service provider 107 (e.g., a merchant), an optional communication link 105 (Internet, POTS, etc.), and a camera based reader 109.

Figure 2:
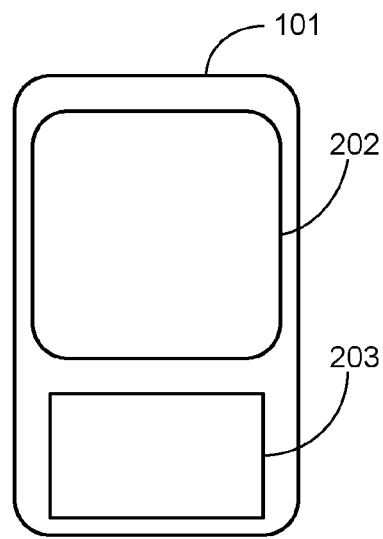
FIG. 2 illustrates a portable communication device according to one embodiment of the invention.
Figure 3:
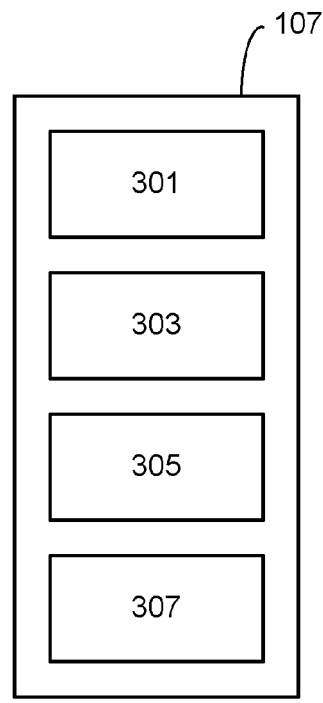
FIG. 3 illustrates a service provider according to one embodiment of the invention.

The portable communication device 101 can be any portable communication device, for example, a mobile telephone, PDA, etc., which can communicate with an external communication system and has a screen 202 for displaying graphical information and a keypad 203 for entering data as illustrated in FIG. 2. The service provider 107 comprises among other features, a transmitter/receiver 301 for communicating with the communication system 103 and/or communication link 105, a processor 303 for creating the code grid, a database 305 for storing the code data and an optional account database 307 for charging the customer for the service or good requested as illustrated in FIG. 3.

A customer can contact the service provider using the portable communication device 101 or some other communication device using either the communication system 103 or the communication link 105 to request the purchase of a good or service. For example, the customer may want to buy a bus ticket from the bus company or a ticket to go to a concert or sporting event from a ticker broker. In either of these examples, the service provider needs to provide the customer with some indication that the customer has been paid for the requested good or service and is entitled to the purchased good or service. In other words, the customer needs a "ticket" for the bus or the concert/sporting event. According to the invention, the service provider 107 creates a code grid which represents the "ticket" which is sent via the SMSC 104 to the designated portable communication device 101 as will be explained in more detail below.

Figure 4:
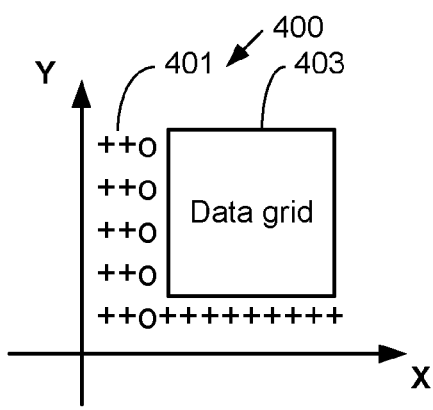
FIG. 4 illustrates a code grid according to one embodiment of the invention.

FIG. 4 illustrates a code grid 400 according to one embodiment of the invention. The code grid 400 may be divided into two sections: a locator border 401 and a data grid section 403 but the invention is not limited thereto. The locator border 401 is used to locate and position the data grid 403. In this illustrative embodiment, the locator border 401 is located along the left side and the bottom of the data grid 403. It will be understood that the locator border 401 can be located along any side or sides of the data grid 403. The locator border 402 is a predetermined pattern of one or more characters that a scanner will be programmed to find so as to properly locate the data grid 403.

Figure 5:
FIG. 5 illustrates an example of a code grid according to one embodiment of the invention.

The data gird 403 is a matrix of at least one character. For example, the data grid is a matrix of [+] and/or [O] characters where [+] represents a zero and [O] represents a one but the invention is limited thereto. Indeed, any combination of characters can be used to represent zero and one, but it is preferable to use characters, which have shapes that are not similar so as to improve the reliability of correctly reading the code. In this embodiment, as illustrated in FIG. 5, the matrix is a [9×4] matrix where every column represents a 9 hexadecimal value [0-F] or in decimal values a value between [0 and 15] and is written as bits with [+] and [O]. The number combination is written as FFFFFFFF in hexadecimal figure and as 4,294,967,295 in decimal format (four billion two hundred and ninety four million nine hundred and sixty seven thousand two hundred and ninety five).

According to one embodiment of the invention, different areas of the data grid can be used to identify various things. For example, the last column can be used as a checksum based on the number of [O] in every row wherein an even number of [O] results in an [O] (true) and an odd number of [O] results in a [+] (false). In another example, the first row or column can be used to identify the service provider 107. Furthermore, various sections of the data grid can identify other information, for example, a certain seat at a concert/sporting event that the purchaser has purchased.

According to one embodiment of the invention, in addition to the graphical representation a numeric code that signifies that the customer has purchased the good or service, the service provider may also include the actual numeric code in the SMS message sent to the portable communication device 101. The actual numeric code is provided in case the reader 109 can not properly decode the code grid 400. In that case, the customer can manually enter the numeric code into the reader 109 via a keypad in or attached to the reader 109.

Figure 6:
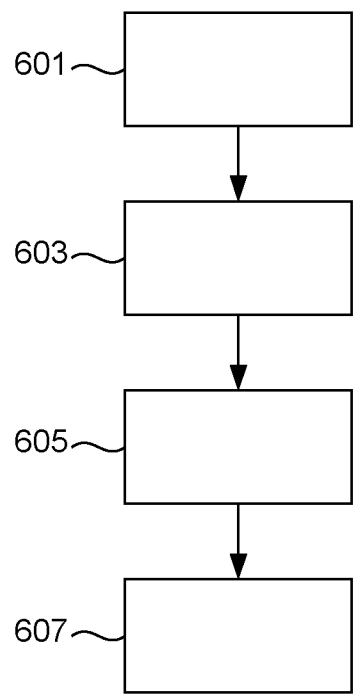
FIG. 6 is a flowchart illustrating a method for providing a code grid to a customer according to one embodiment of the invention.

A method for providing a code grid to a customer using SMS messaging will now be described with reference to FIG. 6. In step 601, the service provider 107 receives a purchase request from the customer in the transmitter/receiver 301. The customer may send the request from their portable communication device 101 through the communication system 103. For example, the customer may place a call to the service provider 107 using the portable communication device 101 or may send an SMS message to the service provider 107 using the portable communication device. In this case, the processor 303 can identify the customer and portable communication device 101 from information contained in the request as well as the service or good requested. In the alternative, the customer may call from a different communication device or contact the service provider 107 via the Internet. In either case, the customer will have to provide some identification information and provide the number for their portable communication device 101 to which the code grid 400 will be sent via SMS.

In response to the request, the processor 303 selects a numeric code to identify the purchase of the requested good or service in step 603. The processor then turns the numeric code into a code grid 400 which will be sent via SMS to the portable communication device in step 605. The numeric code and/or code grid 400 is then stored in a database 305. The database can be located in the service provider 107 or external to the service provider 107. In step 607, the processor 303 creates the SMS message containing the code grid 400 and sends it to the transmitter/receiver 301 for transmission to the portable communication device 101 via the communication system 103.

According to one embodiment of the invention, the service provider secures payment for the good/service before the code grid 400 is sent to the customer but the invention is not limited thereto. For example, the customer's account with the communication system 103 may be charged with the purchase. In the alternative, the customer may set up an account with the service provider, which is charged with the purchase price or the customer may give the service provider a credit card or debit card number to which the purchase is charged using an account database 307.

Figure 7:
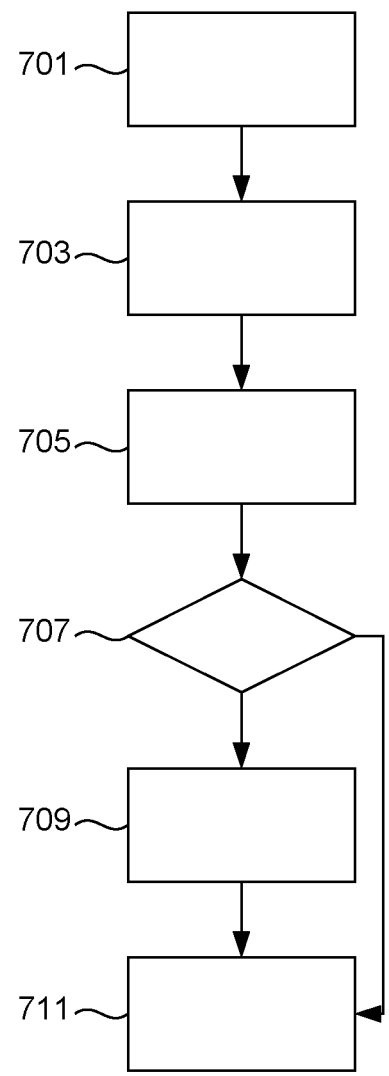
FIG. 7 is a flowchart illustrating a method for using a code grid according to one embodiment of the invention.

FIG. 7 illustrates a method for using the code grid 400 received in the SMS message to obtain the good/service purchased according to one embodiment of the invention. When the SMS message from the service provider is received by the portable communication device 101, the SMS message can be displayed on the display screen 202 in step 701. Since, the code grid 400 is being displayed on the screen 202, the code grid 400 can be read by a camera-based reader 109 in step 703. The reader 109 interprets the data grid 404 within the code grid to obtain the coded numeric value for the purchase in step 705. The reader then clicks the database to determine if the code being displayed on the screen 202 is a valid code in step 707. If it is found that the code is valid, the customer is given the good/service in step 709. According to one embodiment of the invention, if the code is found to be invalid in step 707, the customer can enter the numeric code contained in the SMS message manually into the reader via a keypad in step 711.

Figure 8:
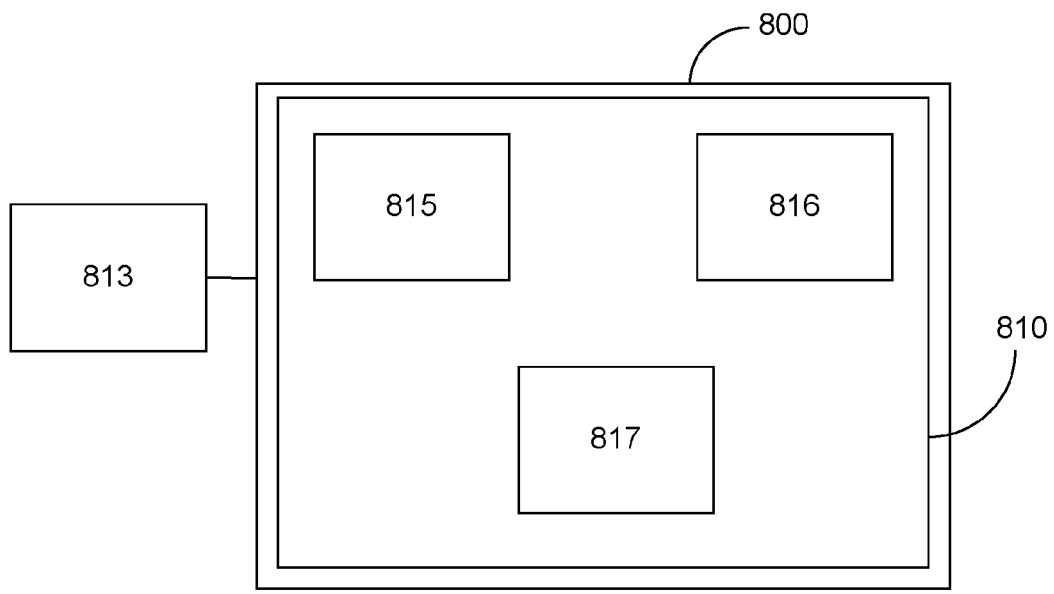
FIG. 8 illustrates a computer program according to one embodiment of the invention.

In another embodiment of the invention according to FIG. 8, a computer-readable medium is illustrated schematically. A computer-readable medium 800 has embodied thereon a computer program 810 for processing by a computer 813, the computer program for processing by a computer, the computer program comprising code segments for sending a code grid representing an indication of payment for a good or service from a service provider, to a customer's portable communication device using SMS messaging. The computer program comprises a first code segment 815 for receiving a request from a customer to purchase good or service; a second code segment 816 for creating the code grid; and a third code segment 817 for sending the code grid to the customer's portable communication device in a SMS message.

According to one embodiment, the matrix is a binary representation of an integer. A matrix comprising 4 rows and 6 columns may be used for representing the integer. Due to the size of the matrix, an upper boundary of the integer is 16777215. Hence the integer that is passed to the matrix can range from 1 to 16777215. This integer is randomly calculated in the database and then converted to a 24-bit binary string using for example java code. The binary string is always 24-bits regardless of the size of the integer. I.e the integer 1 is represented by the binary string 000000000000000000000001 and the integer 2 is represented by the binary string 000000000000000000000010. The binary string is divided into rows where each character in the first row is every forth character of the binary string counted from the first character of the binary string. Each character in row two is every forth character of the binary string counted from the second character of the binary string. The same rule of calculation applies to rows three and four. Column 1 is bits 1-4 of the binary string, column 2 is bits 5-8 of the binary string, column 3 is bits 9-12 and so on. In the final matrix all ones have been replaced by ampersand (&) and all zeros have been replaced by capital letter O. When the matrix is read column wise from left to right, top to bottom the binary string is presented. This binary string may then be converted back to an integer using the standard rules of binary calculus. This integer represents an order in the database.

To the left of and beneath the matrix are characters for positioning the matrix. The sole purpose of these characters are to direct the reading apparatus to where the matrix is located. The positioning characters are O (capital letter O) and +. Hence the matrix contains all characters that is located to the right of the column containing only + signs and all characters above the row containing only + signs. To the right of the area occupied by the matrix is the check sum. This column contains ones and zeros, where a one denotes even number of ones (ampersands) in the current row and a zero denotes odd numbers of ones (ampersands) in the current row. See example 1 below.

Example 1

OO+&&OOO&0
OO+O&&O&&1
OO+&O&OO&0
OO+&OO&OO1
+++++++++
OO+OOOOOO

Only characters in rows 1-4 and columns 4-10 in the Example 1: above should be registered by the apparatus.

The example above illustrates parts of a text message that the end user has received. In this example the matrix is illustrated by rows 1-4 and columns 4-9 and the check sum is illustrated by the characters in rows 1-4 and column 10. The positioning characters are illustrated by the characters in rows 1-4 and columns 1-3, and rows 5-6 and columns 1-9.

When the message in the example is read by the apparatus the first three columns are not "registered" in the system. This only tells the apparatus that after +-column (column three) the actual matrix is displayed. The matrix is then read, starting at column 4, character by character down to the plus sign. Once the plus sign is found the apparatus proceeds to the next column until all columns has been read. Thus, the matrix is read in the following order: &O&& &&OO O&&O OOO& O&OO &&&O 0101 where each ampersand denotes a one and each capital Oh denotes a zero. The last four characters are the check sum. The number of ones on row 1 is 3 hence the check sum for row one is 0 (since 3 is an odd number), the number of ones on row 2 is 4 and hence the check sum for row two is 1 (since 4 is an even number) and so on.

Once the binary string has been deciphered it is converted back to an integer. Thus, the binary string 101111000110000101001110 is translated to the integer 12345678 (twelve millions three hundred and forty five thousand six hundred and seventy eight). With the help of this integer an order can be found in the database that contains all information for a valid ticket.

The many features and advantages of the invention are apparent from the detailed specification, and thus, it is intended by the appended claims to cover all such features and advantages of the invention, which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method for sending a code grid representing a numeric code indicating payment for a good or service from a service provider, to a customer's portable communication device using SMS messaging, comprising the steps of:

receiving a request from a customer to purchase good or service;

creating the code grid representing a numeric code indicating payment for a good or service, wherein the code grid comprises a non overlapping data grid and locator section;

sending the code grid to the customer's portable communication device in an SMS message for display as a graphical representation on a display screen of the portable communication device, wherein the locator section is a set series of characters appearing along two complete and adjacent sides of the code grid on the display screen to direct a reading apparatus, so that the location of the data grid comprising a matrix of characters can be recognized by the reading apparatus, so that the data grid can be read and interpreted to obtain the numeric code;

wherein said data grid comprises a graphical representation of a numeric code which indicates that the customer has paid for the good or service, and wherein a first section of the data grid is used to identify the service provider and a second section provides the graphical representation of the numeric code.

2. The method according to claim 1, wherein the code grid may be displayed on a screen of the portable communication device and then read from the screen by a camera based reader.

3. The method according to claim 1, wherein said request is accompanied by information which identifies the customer to the service provider.

4. The method according to claim 1, wherein said request contains the telephone number for the portable communication device of the customer.

5. The method according to claim 1, further comprising the step of: obtaining payment from the customer for the good or service being purchased.

6. The method according to claim 5, wherein an account of the customer is billed for the purchase.

7. The method according to claim 6, wherein the code grid has a plurality of rows and columns and the grid is filled with any combination of two characters.

8. The method according to claim 1, wherein the numeric code is a decimal number.

9. The method according to claim 1, wherein the numeric code is a hexadecimal figure.

10. The method according to claim 1, wherein a first section of the data grid is a checksum for each row of the data grid.

11. The method according to claim 1, wherein said customer sends said request via a SMS message to the service provider.

12. The method according to claim 1, further comprising a step of:
saving the code grid in a database for verification.

13. An apparatus for sending a code grid representing a numeric code indicating payment for a good or service from a service provider, to a customer's portable communication device using SMS messaging, comprising:
a receiver for receiving a request from a customer to purchase a good or service;
a processor for creating the code grid representing an indication of payment for a good or service, wherein the code grid comprises a non overlapping data grid and locator section;
a transmitter for sending the code grid to the customer's portable communication device in a SMS message for display as a graphical representation on a display screen of the portable communication device, wherein the locator section is a set series of characters appearing along two complete and adjacent sides of the code grid on the display screen to direct a reading apparatus, so that the location of the data grid comprising a matrix of characters can be recognized by the reading apparatus, so that the data grid can be read and interpreted to obtain the numeric code;
wherein said data grid comprises a graphical representation of a numeric code which indicates that the customer has paid for the good or service, and
wherein a first section of the data grid is used to identify the service provider and a second section provides the graphical representation of the numeric code.

14. A non-transitory computer-readable medium having embodied thereon computer executable instructions for processing by a computer, the computer executable instructions, comprising:
a first code segment for receiving a request from a customer to purchase good or service;
a second code segment for creating a code grid representing a numeric code indicating payment for a good or service, wherein the code grid comprises a non overlapping data grid and locator section; and
a third code segment for sending the code grid to the customer's portable communication device in a SMS message for display as a graphical representation on a display screen of the portable communication device, wherein the locator section is a set series of characters appearing along two complete and adjacent sides of the code grid on the display screen to direct a reading apparatus, so that the location of the data grid can be recognized by the reading apparatus, so that the data grid comprising a matrix of characters can be read and interpreted to obtain the numeric code, when said computer program code means is run by an electronic device having computer capabilities;
wherein said data grid comprises a graphical representation of a numeric code which indicates that the customer has paid for the good or service, and
wherein a first section of the data grid is used to identify the service provider and a second section provides the graphical representation of the numeric code.

15. A computer program product comprising computer program code means to execute the method according to claim 1 when said computer program code means is run by an electronic device having computer capabilities.

* * * * *